Patented Nov. 7, 1922.

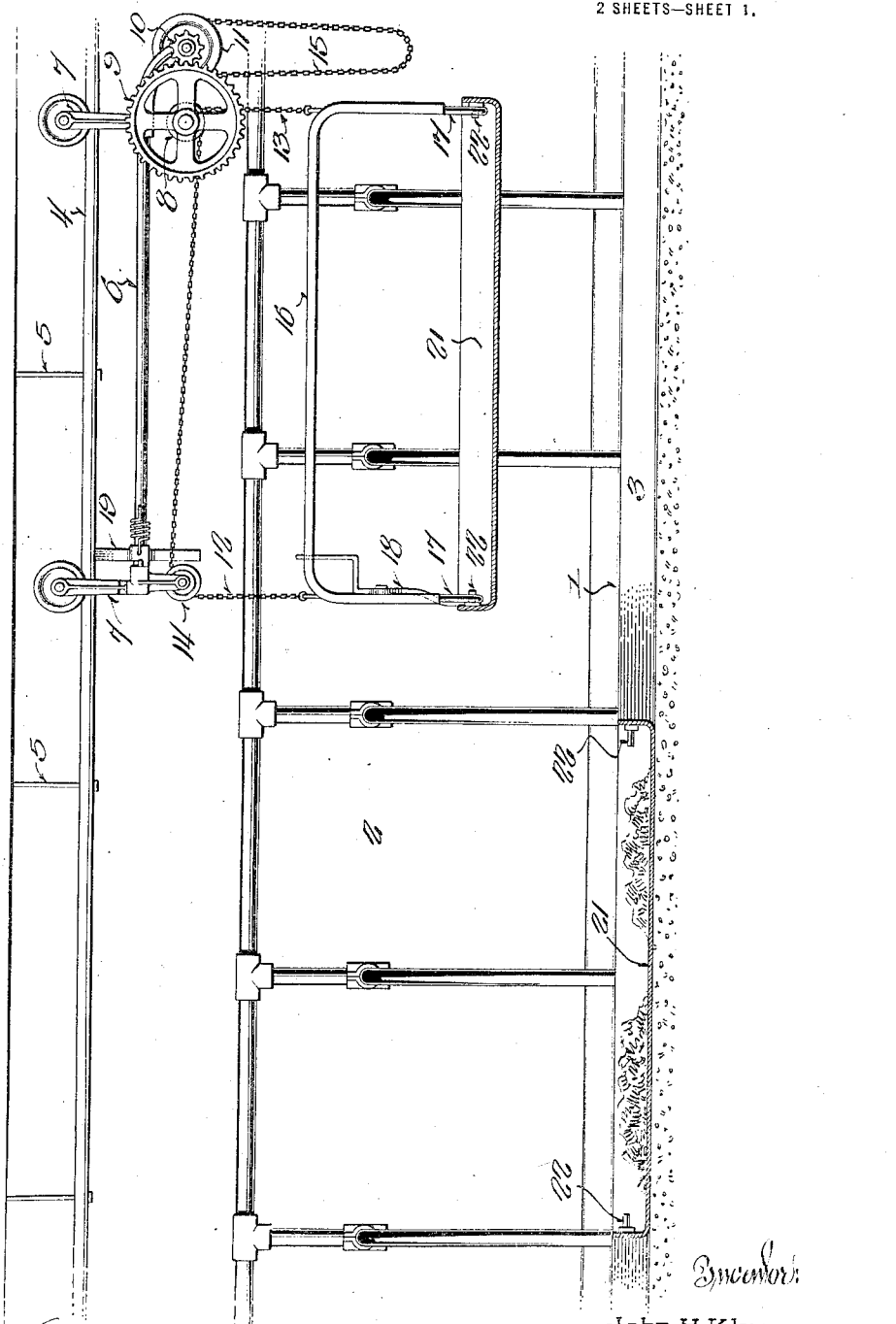

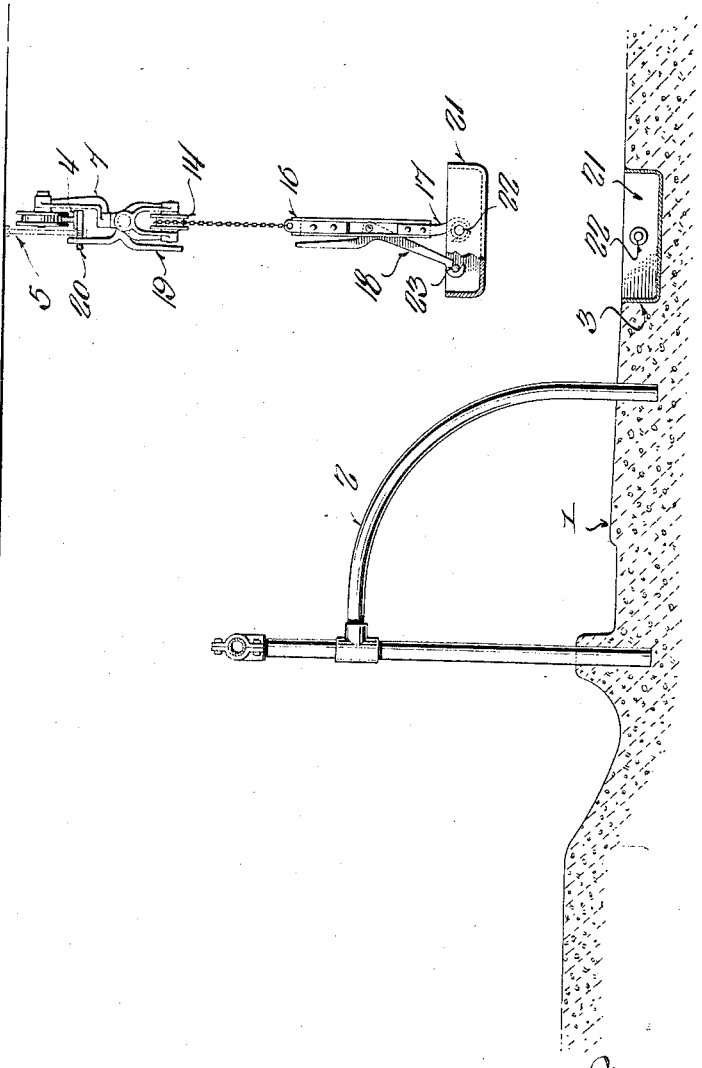

1,434,826

UNITED STATES PATENT OFFICE.

JOHN H. KLUG, OF RANDOM LAKE, WISCONSIN.

MANURE CARRIER.

Application filed June 29, 1920. Serial No. 392,729.

*To all whom it may concern:*

Be it known that JOHN H. KLUG, a citizen of the United States, and resident of Random Lake, in the county of Sheboygan and State of Wisconsin, has invented certain new and useful Improvements in Manure Carriers; and he does hereby declare that the following is a full, clear, and exact description thereof.

My invention relates to new and useful improvements in barn equipment and has particular reference to means for removing manure and other refuse from different parts of a barn to the exterior thereof, or other locality.

At the present time most up-to-date barns, especially those used on dairy farms are equipped with carriers and conveyors of different types, but in all of them it is essential that the refuse and manure be shoveled or otherwise deposited in the pan thereof before the same can be removed. Inasmuch as practically all barns are provided at the rear of the stalls with a gutter, it is the primary object of this invention to provide a gutter lining in the form of pans, which cover the gutter completely, and any one of which can be readily removed and replaced without using a shovel to clean the gutter.

With this and other objects in view, the invention resides in the novel features of construction, combination and arrangement of parts which will be hereinafter more particularly described and claimed.

In the accompanying drawings,

Figure 1 represents an elevational view, partly in section, showing the application of my invention in a barn building provided with the customary track supported carrier equipment and a row of stock stalls, and, Figure 2 is a transverse sectional view taken approximately at right angles to the plane of the section of Figure 1.

Referring more particularly to the drawings, the reference character 1 denotes a barn floor having a row of upright spaced frames 2 secured therein and forming a plurality of animal stalls. At the rear of the stalls and extending substantially throughout the length thereof is a refuse or manure gutter 3, this being of any desired or preferred width and depth. Disposed above the stalls and preferably over the gutter 3 is a carrier track 4, this being suspended from a suitable portion of the barn as indicated at 5. In the average barn equipped with carrier apparatus which includes a track such as the track 4, means is provided for extending the latter to the exterior of the building or at some suitable place where it is desired to deposit the manure conveyed.

The apparatus which is designed to run on this track 4 may consist of a carriage 6 including wheeled end members 7 and a hoist device. In the present embodiment of the invention this hoist device comprises a winding drum $8^a$, drum gear 9 having a drive pinion 10 meshed therewith and connected with the axis of an operating pulley 11. A pair of chains 12 and 13 are adapted to be wound on the drum 8, one of these chains being trained over a pulley 14 so as to space their ends apart. By pulling on the operating chain 15 the drum 8 can be rotated through the drive pulley 11.

The chains 12 and 13 are connected with the opposite ends of a substantially U-shaped receptacle engaging frame 16, the same having a hook 17 at the free end of each of its legs. A latch bar 18 is pivoted to one of said legs and has its pin engaging and disposed adjacent one of the hooks 17. Oscillatorially mounted on the shaft of the carriage 6 is a trip lever 19, one end of which is designed to be engaged with the upper end of the latch 18, whereas its other end is in position to be brought into contact with a trip 20 when the carriage 6 has been moved to a predetermined position on the track 4.

In the gutter 3 is located a plurality of lining members in the form of pans 21, each of these pans being of such a width and depth as to snugly seat in the gutter and have their upper edges flush with the surface of the floor 1 adjacent the gutter. The length of the pans is immaterial, but a plurality of the same are disposed in the gutter and positioned end to end in abutting relation so that a continuous lining is provided. The manure and other refuse may thus be readily raked into the pans instead of into the gutter as is the present practice. The inner end of each pan 21 has an inwardly projecting central pivot stud 22, and on one end of each pan at a point spaced from the central lug is a latch pin 23.

In operating the invention, the carrier mechanism including the carriage 6 and frame 16 is moved on the track 4 to a point above the pan 21, which it is desired to remove from the gutter 3 and empty. Thereupon the frame 16 is lowered until the hooks 17 thereof can be engaged with the pivot studs 22 of the selected pan, and after such engagement, the latch 18 is brought into contact with the latch pin 23. Upon rotating the drum 8 to wind the chains 12 and 13 thereon, the selected pan 21 is raised out of the gutter and elevated to a suitable height. Inasmuch as the trip 20 is located adjacent said discharge point, the pan can be automatically emptied by the mechanical disengagement of the latch 18 from the latch pin 23, this being caused by the rocking of said trip lever 19 and latch 18 when the two are engaged as they will be when the frame 16 and its pan have been elevated a proper distance above the barn floor. In other words, as soon as the latch 18 becomes inactive, the carried pan will be permitted to rock on its pivot studs 22.

After the pan has been emptied the carrier mechanism can be returned to the starting point and the said pan lowered again into the gutter. A series of pans can thus be very quickly emptied, and refuse removed from the barn at a much quicker rate than is at present possible. Furthermore, the provision of gutter lining pans eliminates the necessity of several handlings of the manure. If necessary or desirable a particular type of carrier mechanism can be employed with the pans, but as most barns are at present constructed and equipped, the usual carrier device, or parts thereof, can be used.

Various changes may be made in the form and proportions and the general application of the invention without departing from the principles thereof or sacrificing any of its advantages.

I claim:

1. In a stable for live stock, a gutter, and a plurality of lining members in said gutter, each being in the form of an independent separately movable pan, said pans being substantially the width of the gutter and disposed end to end in abutting relation.

2. In a stable for live stock, a gutter, a plurality of lining members in said gutter, each being in the form of an independent separately movable pan, said pans being substantially the width of the gutter and disposed end to end in abutting relation, an inwardly extending lifting element on each end of each pan, and means detachably engageable with the elements of each pan for individually removing or replacing said pans with respect to the gutter.

3. In a stable for live stock, a gutter, a plurality of lining members in said gutter, each being in the form of an independent separately movable pan, said pans being substantially the width of the gutter and disposed end to end in abutting relation, an inwardly extending pivot stud on the end of each of said pans, lifting means selectively engageable with the studs of either of said pans for raising the same from the gutter, and means for normally preventing tilting of the raised pan.

In testimony that I claim the foregoing I have hereunto set my hand at Random Lake, in the county of Sheboygan and State of Wisconsin.

Dr. JOHN H. KLUG.